United States Patent [19]

Steinhart

[11] Patent Number: 4,680,729
[45] Date of Patent: Jul. 14, 1987

[54] METHOD AND APPARATUS FOR STORING AND UPDATING USER ENTERED COMMAND STRINGS FOR USE WITH OTHERWISE UNASSIGNED SOFTKEYS

[75] Inventor: Jonathan E. Steinhart, Portland, Oreg.

[73] Assignee: Tektronix, Inc., Beaverton, Oreg.

[21] Appl. No.: 505,561

[22] Filed: Jun. 17, 1983

[51] Int. Cl.[4] .................... G06F 15/00; G06F 12/00; G06F 3/00
[52] U.S. Cl. ................................. 364/900; 340/712; 340/365 VL; 400/70; 400/477; 400/493
[58] Field of Search ... 364/200 MS File, 900 MS File; 340/712, 735, 365 VL; 400/477, 479, 479.1, 479.2, 70, 493

[56] References Cited

U.S. PATENT DOCUMENTS

| | | | |
|---|---|---|---|
| 4,198,685 | 4/1980 | Corwin et al. | 364/900 |
| 4,200,913 | 4/1980 | Kuhar et al. | 364/900 |
| 4,202,041 | 5/1980 | Kaplow et al. | 364/900 |
| 4,330,845 | 5/1982 | Damerau | 364/900 |
| 4,481,587 | 11/1984 | Daniels, Jr. | 340/365 VL |
| 4,566,001 | 1/1986 | Moore et al. | 340/365 VL |

Primary Examiner—Archie E. Williams, Jr.
Assistant Examiner—Thomas C. Lee
Attorney, Agent, or Firm—Robert S. Hulse; Allston L. Jones

[57] ABSTRACT

The assignment of user entered strings to blank softkeys within a node or menu is automatic. As the user enters a command string, the new information is checked against the information on all of the softkeys in the node. If a match is found, and that match is not associated with a user definable softkey, nothing is done. If a match is found, and that match is associated with a user definable softkey, the age parameter on the string to be stored with respect to that softkey is set to 0 (0 is the youngest age character). The age of all of the other stored user defined strings for the menu is incremented by one.

If no match is found, a search is made for a blank user definable softkey, searching from left to right (f1 to f8). If a vacancy is found, the information will be assigned to that softkey with an age of 0, and the age of all of the other user assignable softkeys in the menu will be incremented.

If there are no blanks, the new information will be assigned to the softkey having the stored data with the oldest age in the menu. The previous information assigned to that softkey is overwritten. The new information will be assigned an age of 0, and the ages of the others will be incremented by one.

2 Claims, 6 Drawing Figures

| BLOCK ACTION POINTER (START OF MENU ADDRESS) | | | | | | | |
|---|---|---|---|---|---|---|---|
| POINTER FOR START ADDRESS OF LABEL FOR | | | | | | | f1 |
| " | " | " | " | " | " | " | f2 |
| " | " | " | " | " | " | " | f3 |
| " | " | " | " | " | " | " | f4 |
| " | " | " | " | " | " | " | f5 |
| " | " | " | " | " | " | " | f6 |
| " | " | " | " | " | " | " | f7 |
| " | " | " | " | " | " | " | f8 |
| POINTER TYPE | 0 | 1 | 1 | 0 | 0 | 1 | 0 0 0 0 0 0 0 0 0 |
| KEY | f8 | f7 | f6 | f5 | f4 | f3 | f2 f1 |
| POINTER FOR START ADDRESS OF STORED DATA FOR | | | | | | | f1 |
| " | " | " | " | " | " | " | f2 |
| " | " | " | " | " | " | " | f3 |
| " | " | " | " | " | " | " | f4 |
| " | " | " | " | " | " | " | f5 |
| " | " | " | " | " | " | " | f6 |
| " | " | " | " | " | " | " | f7 |
| " | " | " | " | " | " | " | f8 |

FIG. 2.

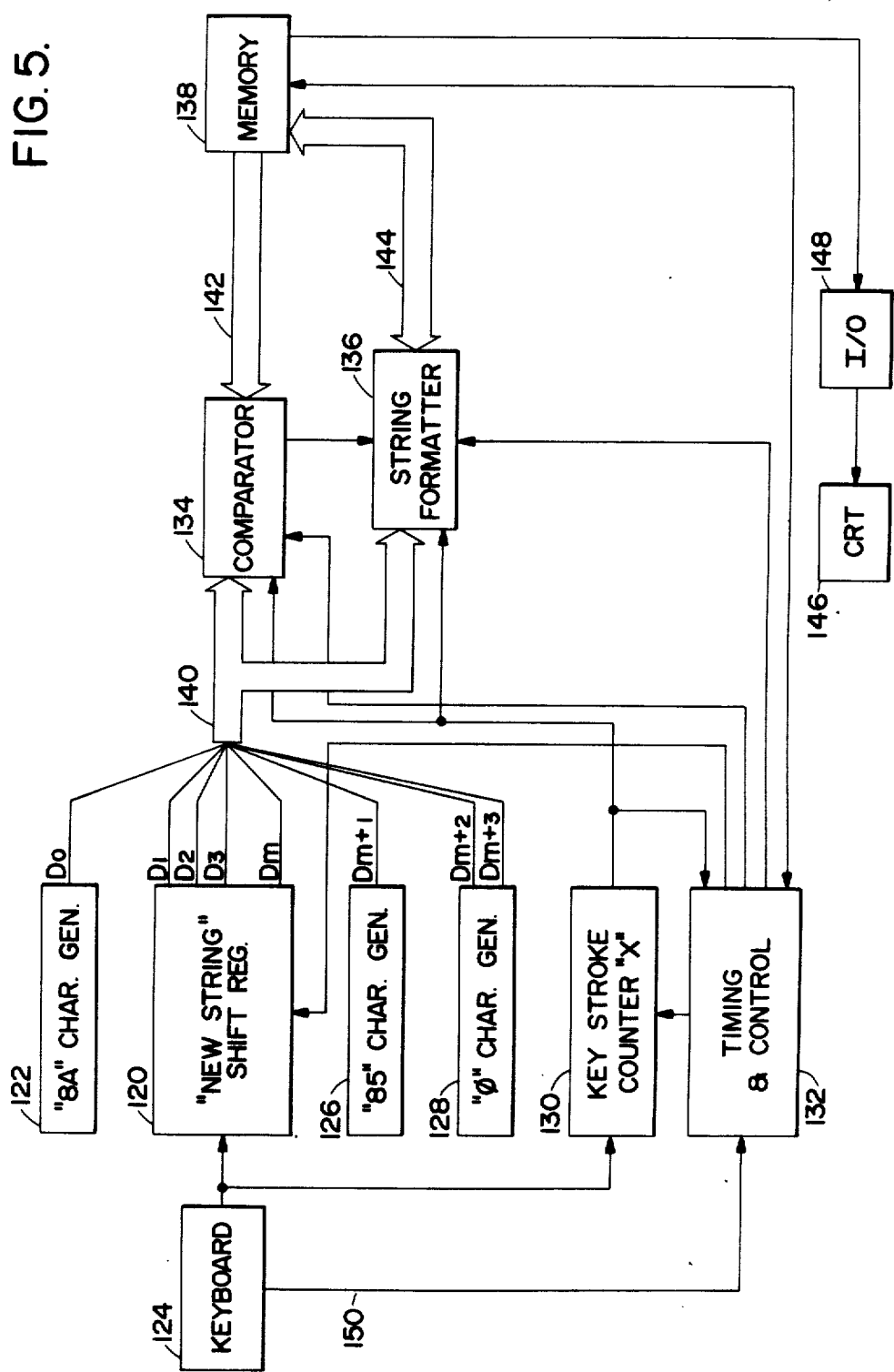

METHOD AND APPARATUS FOR STORING AND UPDATING USER ENTERED COMMAND STRINGS FOR USE WITH OTHERWISE UNASSIGNED SOFTKEYS

BACKGROUND OF THE INVENTION

This invention relates to the maximization of functions and characters to be initiated or generated from a keyboard without increasing the number of keys, more specifically, the automatic entry of user entered command strings in association with otherwise unassigned softkeys to facilitate subsequent entry of the same command string by means of the softkey to which it was assigned.

Softkeys have been incorporated into computer terminals in an effort to minimize the number of keys on the keyboard while increasing the number of functions which the keyboard can perform. A typical machine which utilizes softkeys is menu driven. As the user selects the desired menu, usually via a start-up menu, one or more of the softkeys are labeled on the CRT for the function which will be performed when that key is depressed.

The most common number of softkeys on a terminal keyboard is eight, however, several machines currently on the market have many times that number. Often terminals having only eight softkeys will have numerous keys within each menu which are blank and not "hard-wired" by the program to perform a preselected function.

In many situations a user may have to enter a string of characters in response to a prompt from the program which he is utilizing. Additionally, in some situations, the string which the user must enter is an alphanumeric string which is not a standard english word. Thus, the user must double-check the string before the entry is made by pressing "RETURN" or another appropriate key. Further, it is necessary in some situations to have to reenter the same string at numerous times, e.g. in a computer aided design situation. The necessity of repeatedly entering the same complex string greatly increases the possibility of errors.

To make maximum use of the softkeyes and to increase user convenience by reducing the possibility of errors, it would be advantageous to have a system which automatically assigns user entered strings to an available softkey within that menu. This would then allow the subsequent reentry of the string by depressing that softkey. Further, it would be advantageous to have a system which updates the user entered strings stored in the softkey memory each time the user actuates one of those keys, or explicitly enters a new string, so that only the most current and most often used strings are stored in the available softkey memory for the menu. It is believed that the present invention embodies such a system.

SUMMARY OF THE INVENTION

In accordance with the illustrated embodiment, the disclosed system for assigning user defined strings to otherwise unused softkeys within a selected node or program menu will greatly facilitate the repeated entry of special strings by a computer user when the computer is being used in an interactive mode. Often the user may have to repeatedly enter long non-literal, as well as literal, strings which is very time consuming since the correctness of the string must be checked before it is entered. Thus, by assigning these strings to softkeys which are not hardwired into the program, the accuracy of, as well as the speed of, the user's entry of the strings is greatly enhanced.

The present invention provides a method and a system for storing user entered strings in association with blank softkeys upon their first entry, thus making them available for future use by simply depressing the softkey to which that string was assigned by the system. This is accomplished by comparing the user entered string against the data stored for each softkey, and returning control to the user after completing the function associated with the user entered string if a match is found. If a match is not found, then the search continues for a blank softkey, where, if a match is found, storing of the user entered string is performed in an appropriate memory location associated with that softkey, a label to be displayed for that softkey is generated and stored, the functions associated with the user entered string are executed, and control is returned to the user. If a blank softkey was not found then the user entered string is overwritten into the memory location associated with the softkey having the oldest user entered string. Then, a label to be displayed for the newly stored string is generated and stored in the appropriate memory location for that string, which is followed by the execution of the functions associated with the user entered string. Finally, control is returned to the user.

DESCRIPTION OF THE FIGURES

FIG. 2 is representative of the node or menu pointer memory structure for a system with eight softkeys.

FIG. 5 is a block diagram of a system for implementing the present invention.

DESCRIPTION OF THE PREFERRED EMBODIMENT

Figure 1:
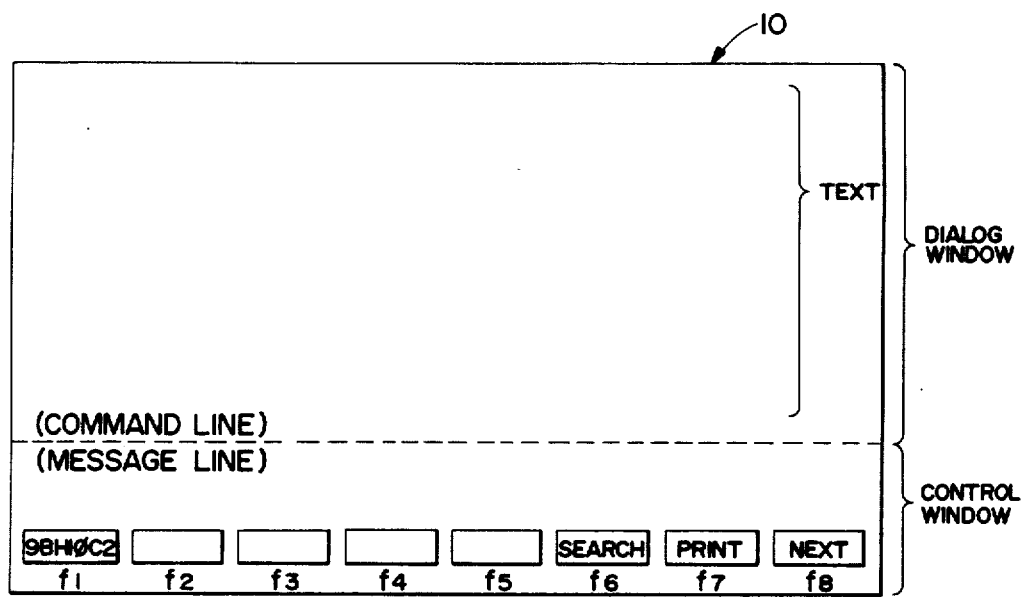
FIG. 1 shows a typical CRT display format having the softkey labels along the lower edge thereof.

In FIG. 1 there is shown a typical CRT display 10 for a computer having eight softkeys. The screen is divided into a dialog window and a control window. The dialog window includes a text area and a command line, and the control window includes a message line and eight locations for labels, one for each of the softkeys. In this figure the softkeys are identified as $f_1$–$f_8$. The label areas are generally displayed in inverse so that a blank label location is positively identified by an illuminated rectangle. When a key is labelled, the illumination in each character area is extinguished.

For illustration purposes softkeys $f_1$ and $f_6$–$f_8$ are shown having labels. The labels on keys $f_6$–$f_8$ represent hard wired labels, i.e. labels provided by the program for the particular menu being displayed. These labels may be identifiers for one of three types of pointers:

an action pointer for identifying a memory location for a command string to be executed within the current menu;

a simple pointer for identifying a memory location for the start of another menu or node; and a complex pointer for identifying a memory location for a menu only having simple pointers.

As will be seen in FIG. 2, the pointer associated with $f_6$ and $f_8$ are simple pointers and the one associated with $f_7$ is a complex pointer. The pointer type for each of keys $f_1$-$f_5$ are action pointers. The action strings for $f_2$-$f_5$ are NULL, whereas the action string for $f_1$ is at least 9BH10C2 which was user entered.

FIG. 2 shows the block structure for recalling the labels and associated function data from memory for each of the sofkeys. One of these blocks exists for each menu within the program. The item 12 is a pointer to the start of the selected menu address in memory, this is followed by an individual pointer 14 to the start of the address for the label to be displayed for each of the softkeys. For illustration purposes eight softkeys are included, however, any number of softkeys can be supported by the present invention. The next item in the block is an identification of the pointer type 16 for the stored data for each of the softkeys. As identified above, there are three pointer types, and they are identified here as follows:

00 action pointer
01 simple or block pointer
10 complex or interblock pointer
11 usused Finally, the block includes a pointer 18 to the start address in memory for the stored data associated with each of the softkeys.

Figure 3:
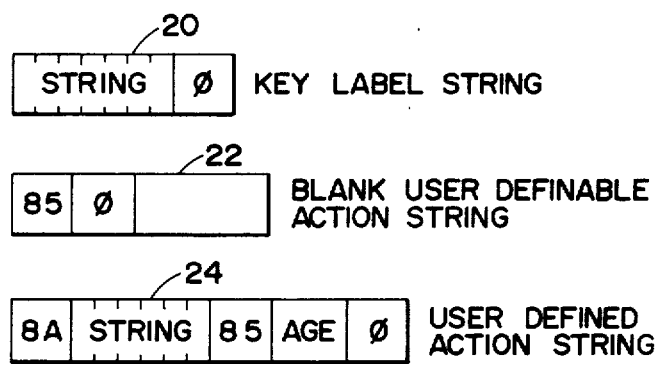
FIG. 3 shows a representation of the string storage formats for use with the user definable softkeys of the present invention.

Referring now to FIG. 3 there is shown the format in which the label and actual data for each of the softkeys is stored in the memory. The key label data 20 includes the actual alphanumeric label which is to be displayed on the CRT followed by the end of string designator, "0". A user definable action or command storage data location will be initialized as a blank user definable action string 22, having a history marker (e.g. "85") followed by the end of string designator, "0". The stored user defined action string 24 has a user entered string identifier (e.g. "8A"), followed by the actual alphanumeric string entered by the user, the history marker, the age of the user defined string, and, finally, the end of string designator. The age character identifies the relative age of the user entered string with respect to each of the other user entered strings stored in the stored data memory locations of the user definable softkeys. The user entered strings are commands, actions or responses which the user enters in response to a prompt on the command line in the dialog window of the CRT, and for which there is not a hardwired key for that response.

Figure 4A:
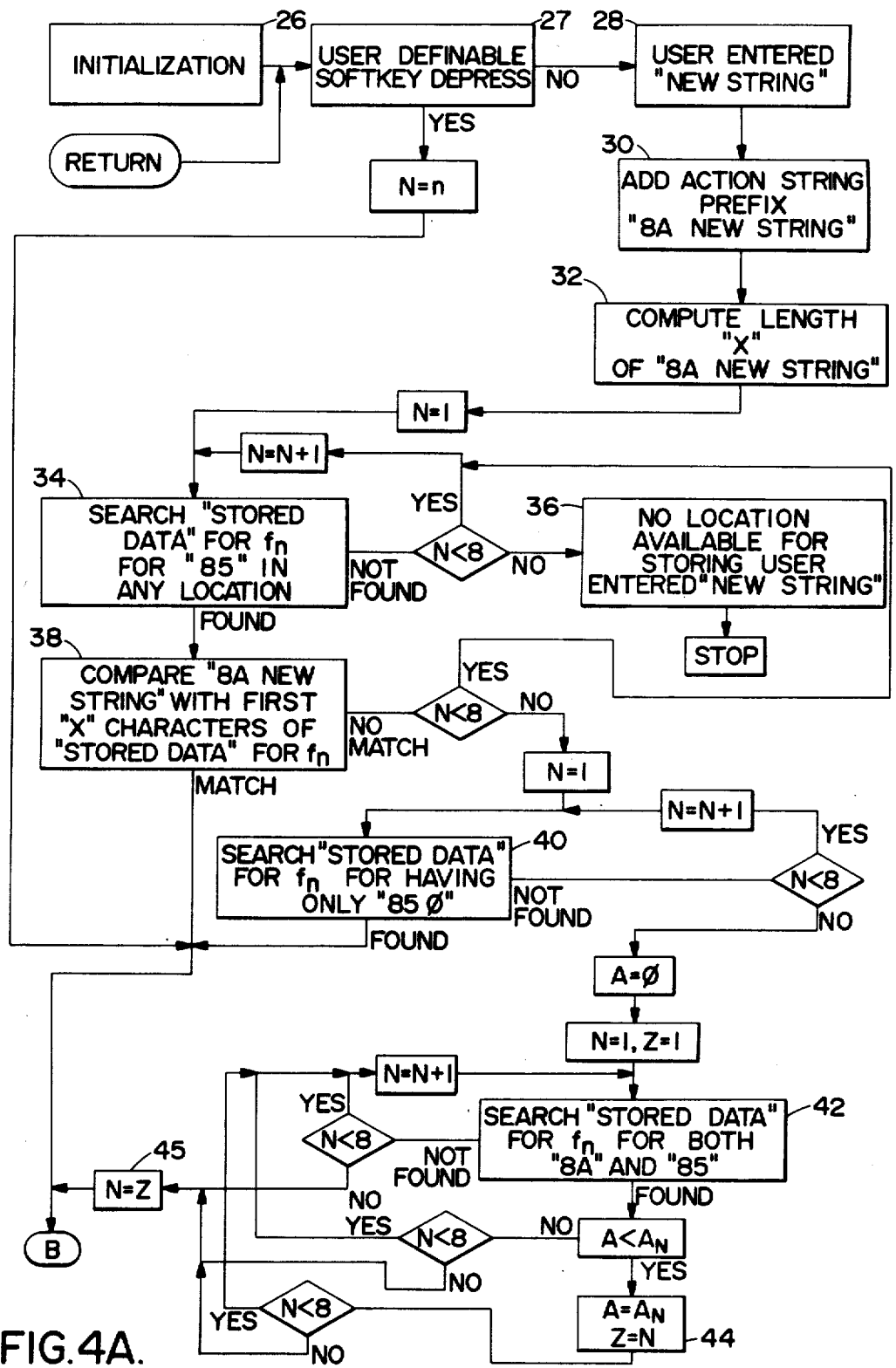
FIGS. 4A and B is a flow chart of the system of the present invention.
Figure 4B:
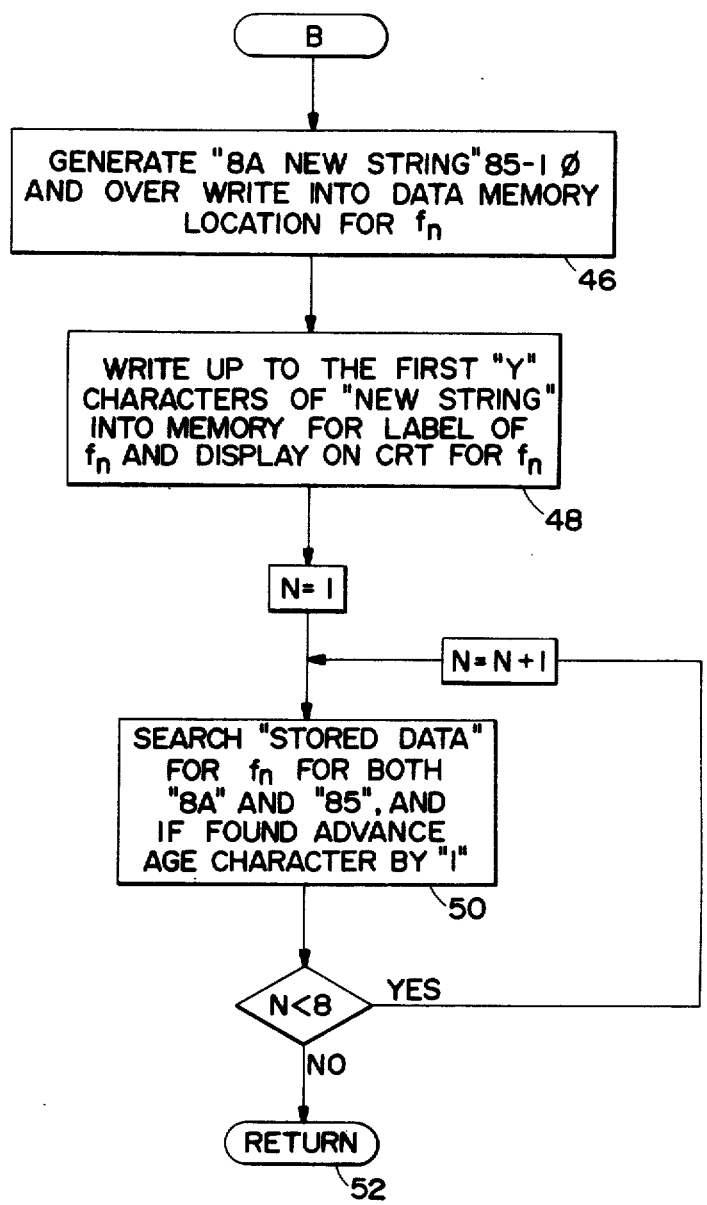

FIGS. 4A and B present a flow chart which describes the automatic assigning and aging of user entered strings in the available softkey memory locations. The first step is the initialization of the available softkey memory locations (block 26) as discussed above in relation to FIG. 3. A user may respond to a prompt on the command line by either depressing a softkey or by explicitly entering a string. If the user enters a string or depresses a user definable softkey, the present invention is activated. Block 27 determines if a user definable softkey has been depressed, if it has, N is set to the number of that softkey and the process continuous at block 46, otherwise flow continues to block 28. When a user enters a "new string" (block 28), the user entered string identifier "8A" is prefixed onto the "new string" (block 30). At block 32 the length of the modified new string is computed. This step could be performed in parallel with the functions of blocks 28 and 30. Next, the stored data locations for each softkey are searched for a history marker, "85", in any location within the data storage area (block 34), if none are found, there are no softkeys available within the selected menu which are user definable (block 36). The first "x" characters of the stored data string of each user defined softkey is compared with the modified new string (block 38). If a match is found, the operation continues at block 46, if a match is not found, the next step is to search for a softkey having a blank user definable action string (block 40). If a blank is found, the process proceeds to block 46, if a blank is not found, a search is done on the user defined action strings for the one having the oldest age character, A (block 42). When it is found, N is reset to the number of the softkey having the highest age character (blocks 44 and 45). From this point the process continues at block 46.

At block 46 the modified new string is completed by adding the history marker, "85", an age character which is one less than the youngest possible, "−1", and a "0", the end of string character. This string is then written into the data storage location for softkey N which was identified earlier in the process. Next, up to the first "Y" characters (Y is the maximum number of character spaces on the CRT label for a softkey) of the "NEW STRING" portion of the stored data for softkey N is written into the label memory location for that key to be displayed as the current label (block 48). Finally, the age character for each user defined action string in the softkey stored data is advanced by one (block 50) and the flow returns, via block 52, to block 28 where the entry of the next user entered string is awaited.

FIG. 5 shows an embodiment of the present invention which includes a keyboard 124, variable length shift register 120, counter 130, comparator 134, memory 138, and string formatter 136. In addition there are three character generators, "8A" generator 122, "85" character generator 126, and "0" character generator 128, timing and control 132, CRT 146, and I/O interface 148.

In this configuration the user enters the new string explicitly from, or by depressing a softkey on, keyboard 124. If the new string is entered explicitly it is applied to the first x character positions of shift register 120 (X is the number of characters in the new string and $X \leq M$) and the number of characters in the string is counted by the keystroke counter 130. If a user defined softkey is depressed, the key number is transferred via line 150 to timing and control 132.

Starting with the explicit entry of the new string by means of keyboard 124, counter 130 applies the character count X to variable length comparator 134 and timing and control 132. The characters $D_1$-$D_x$ from shift register 120 and "8A" ($D_0$) from generator 122 are transferred to comparator 134 via line 140. Then, the first 0-X characters of each stored data string for the user definable softkeys are sequentially transferred to comparator 134 via line 142 and search for a match is conducted. If match is found, or if the user depressed a user defined softkey, the control and timing unit 132 sets the age character of that stored data string to zero (the youngest age) and advances the age character of each other stored data string having an age character by one.

If a match was not found, and the menu at hand includes user definable softkeys, a string "850" ($D_{M+1}D_{M+2}$) is transferred to comparator 134 where it is compared with the full array of each of the stored data for each of the softkeys. If a match is found (a blank user definable softkey is found) $D_o$-$D_x$ and $D_{M+1}-D_{m+3}$ are loaded into the string formatter 136 having an 0 age character ($D_{M+2}$) and that string is then written into the data storage location in memory 138 for the appropriate softkey.

If no match was found in the search for a blank, user definable softkey, the age characters of each of the user defined data strings stored with respect to each softkey must be searched for the oldest age. This can be performed by loading the string $D_{M+1}-D_{M+3}$ into comparator 134 and searching for the last three characters on each of the stored data strings for each softkey. If an "85" and a "0", separated by an age designator, are found at the end of the stored data string, the age designators are compared. If the age designator in the stored data is greater than that of the entered $D_{M+2}$, $D_{M+2}$ is changed to the value of the age designator of the stored data. This continues until the oldest user deisgnated stored data is identified and the new string is then written into that data location with a zero age designation as discussed above. Subsequently, the age designators in each of the other stored data strings is advanced by one.

The string formatter 136 each time it enters a new, or over writes an old, user defined string into memory, it also truncates the user defined string to the maximum character length displayable as a label on CRT 146 for a softkey and stores that truncated string in the appropriate label memory (see FIG. 3).

Table 1 is included to show a computer program implementation of the present invention that is compatible with UNIX (trademark of Bell Laboratories) based computer systems.

Jun 2 13:03 1983  ksh.h  Page 1          TABLE 1

```
/************************************************************
 *                                                           *
 * Module:              header file                          *
 * Main program:        ksh                                  *
 * Version:             1.0                                  *
 * Date:                June 2, 1983                         *
 * Author:              Jonathan E. Steinhart                *
 *                                                           *
 ************************************************************/

/************************************************************
 *                                                           *
 *           Copyright (C) 1983 Tektronix, Inc.              *
 *                  All Rights Reserved                      *
 *                                                           *
 ************************************************************
 *                                                           *
 *    ######    #    #              #                        *
 *    #         #    #                                       *
 *    #   ###   #    #  ####  #### ####  #  #  #             *
 *    #   #  #  # #  # #    #  #    #    #  #  #             *
 *    #   ####  ###  # #    #  #    #    #  ##   R           *
 *    #   #     # #  # #    #  #    #    # #  #    ...       *
 *    #    ####   #  #  ####  ####  #    #  #  #             *
 *                                                           *
 *                 COMMITTED TO EXCELLENCE                   *
 *                                                           *
 ************************************************************/

/* Purpose:   Supplies global declarations and various definitions for ksh
 *            Anything worth tweaking is defined here.
 */

/* These define the action codes. There must be a one to one correspondance
 * between these values and the 'acts' array in 'tables.c'.
 */ define BACK     0x80
define BREAK    0x81
#define CALL     0x82
#define CMD      0x83
#define EXEC     0x84
#define HIST     0x85
#define LIM      0x86
#define MAN      0x87
#define MSG      0x88
#define NEXT     0x89
#define PAR      0x8a
```

```
#define RETURN          0x8b
#define SLY             0x8c

/* These codes are passed back by some of the action handler subroutines
 */ define RESUME          -1              /* keep executing actions
define STOP            0               /* stop executing actions /* * WARNING * If NKEYS ever becomes greater than 8, the size of the
 *                 element 'pt' in TREENODE et. al. must be changed.
 */ define NKEYS           8               /* number of soft keys
define NFKEYS          16              /* number of function keys /* This structure is used to build the linked command tree in memory.
 */
                                        /* tree node template
typedef struct node {
        char    *ap;                    /* pointer to action string
        char    *lp[NKEYS];             /* pointers to label strings
        int     pt;                     /* describes union ptr. type
        union {                         /* this saves memory space
                char            *kap;   /* local action str. for key
                struct node     *dp;    /* pointer to another node
                struct node     **dpp,  /* set of node pointers
        } ptr[NKEYS];                   /* one pointer for each key
} TREENODE, *TREE_PTR;

/* Each pair of bits in pt describe the function of the unionized pointer.
 *
 *      00      means   *kap
 *      01      means   *dp
 *      10      means   **dpp
 *
 * Bits 0 and 1 are used for NKEYS == 0, 2 and 3 for NKEYS == 1, etc.
 *
 * The following stuff is used to set and/or test the pointer type:
 */ define KAP             0               /* key action pointer code
define DP              1               /* sole node  pointer code
define DPP             2               /* node  pointer set code define Setptr(k,t)     (tree->pt |= (t << (k << 1)))    /* set pointer type define Tstptr(k,t)     (((tree->pt >> (k << 1)) & 0x3) == t)    /* test ptr typedef char    FLAG;                   /* used for indicators /* whereami stack template
struct where {
        int             w_key;          /* key pressed in this node
        TREE_PTR        w_ptr;          /* pointer to node
};

/* Tweaks and other sundries.
 */
                                        /* size of command buffer
#define CB_SIZE         256             /* size of argument buffer
#define CP_SIZE         64              /* default history list size
#define HIST_DFL        20              /* monitor file for -s option
#define M_FILE          "ksh.out"       /* size of message buffer
#define MB_SIZE         256             /* shell used by expand
#define SHELL           "/bin/sh"       /* space between tabs
#define TABSTOPS        8               /* no. of complex blocks/node
#define TP_SIZE         50              /* size of the whereami stack
#define W_SIZE          50
```

```c
/* These codes are used to change video attributes  They are used as
 * arguments to the attrib subroutine.
 */ define VA_CLB      6,  5, -1,  1,  0    /* whereami label attributes */
define VA_CLR      6,  6,  6, -1, -1    /* clr line video attributes */
#define VA_CMD      1,  3,  3,  0,  0    /* cmd line video attributes */
#define VA_ERR      1,  4,  3, -1,  1    /* error video aattributes */
#define VA_LBL      6,  5,  6,  1, -1    /* label video attributes */
#define VA_MSG      1,  2,  6, -1,  1    /* msg line video attributes */
#define VA_OFF     -1, -1, -1,  0,  0    /* turn off attributes */
#define VA_RVR      5,  6, -1,  1,  1    /* reverse video attributes */

/* This stuff is used to test for available memory space before trying to
 * allocate it. If TNIX is not defined at compile time, a VAX is assumed.
 */ ifndef TNIX
include <sys/vlimit.h>
#define MEMSIZE     vlimit (LIM_DATA, -1)
#else
#define MEMSIZE     65536L
endif define Memleft     (sbrk (0) < MEMSIZE)

/* These are the error codes. There must be a one to one correspondance with
 * the 'ermes' array in 'error.c'.
 */ define NON_FATAL   0            /* continue after error msg */
define FATAL       1            /*error terminates program */ define BYE_BYE     0
define MEMORY      1
#define BADTTY      2
#define OPENSES     3
#define NOSESS      4
#define TERMNAME    5
#define TERMCAP     6
#define BADTERM     7
#define KILLED      8
#define BUFFOON     9
#define MISS_TC     10
#define USAGE       11
#define UNKNOWN     12
#define REDEF       13
#define ILLARG      14
#define EXTRA       15
#define MISSARG     16
#define INVALID     17
#define ILLDEL      18
#define NOMAIN      19
#define NOCLOSE     20
#define UNEXEOF     21
#define CANTFORK    22
#define CONTROL     23
#define UNMATCH     24

/* These are the codes generated by the shifted function keys.
 * See hardkeys.c
 */ define HELP        8
define WHEREAMI    9
#define EXPAND      10
#define EXPLAIN     11
#define REDRAW      12
```

```
#define HISTORYF      13
#define HISTORYR      14
#define EXECUTE       15

/* These macros are used to create strings. Memory space is allocated
 * (or reallocated) and the string contents are copied in.
 */ char    *malloc (), *realloc ();            /* needed to pacify lint define Newstr(p, b)    if (!(p = (char *)(malloc ((strlen (b) + 1)\
                            * sizeof (char)))))\
                            /* VARARGS */\
                            error (FATAL, MEMORY);\
                        else\
                            strcpy (p, b);

#define Makstr(p, b)    if (p) {\
                            if (!(p = (char *)(realloc (p,(strlen(b)+1)\
                                * sizeof (char)))))\
                                /* VARARGS */\
                                error (FATAL, MEMORY);\
                        }\
                        else {\
                            if (!(p = (char *)(malloc ((strlen (b) + 1)\
                                * sizeof (char)))))\
                                /* VARARGS */\
                                error (FATAL, MEMORY);\
                        }\
                        strcpy (p, b);

/* These macros are used to test action types, mask bytes, and check special
 * characters.
 */ define Bmask(c)        (c & 0xff)                  /* mask to a byte define Adata(a)        (a && !(a & 0x80))          /* locates action data (args)

/* not an action
#define Notact(a)       (a && !((a & 0x80) && (a & 0xff) <= SLY))

#define Special(c)      (c == '^' || c == '%' || c == '$')    /* special

/* These macros put stuff out to the terminal.
 */ define Newline         putchar ('\n')              /* output a new-line define Gong            fputs (quiet ? vb : "\07", stdout)   /* alarm define Erase           fputs (ce, stdout)          /* erase to end of line define Etobotm         fputs (cd, stdout)          /* seras to bottom of screen /* These macros test buffer boundaries.
 */ define In_cb(p)        (p < c_buf + CB_SIZE + 1)   /* command buffer define In_cp(p)        (p < CP_SIZE)               /* pointer buffer define In_mb(p)        (p < m_buf + MB_SIZE + 1)   /* message buffer

/* Global variable declarations.
 */
```

```
extern   FLAG              atype;           /* act. str. type for return
extern   FLAG              quiet;           /* kills annoying bells
extern   TREE_PTR          cur_node;        /* pointer to current node
extern   TREE_PTR          root;            /* pointer to root node
extern   char              c_buf[CB_SIZE];  /* command line buffer
extern   char              *cp[CP_SIZE];    /* command arg. ptr. buffer
extern   char              m_buf[MB_SIZE];  /* message line buffer
extern   int               clrline;         /* line no. of clear line
extern   int               cmd_x;           /* command line cursor pos.
extern   int               cmdline;         /* line no. of command line
extern   int               labline;         /* line no. of label line
extern   int               labsize;         /* width of key labels
extern   int               locale;          /* current cursor line
extern   int               msg_x;           /* message line cursor pos.
extern   int               msgline;         /* line no. of message line
extern   int               n_cmd;           /* number of command args.
extern   int               n_cols;          /* screen width
extern   int               n_rows;          /* screen height
extern   int               ns_cmd;          /* arg. no of saved command
extern   int               ns_msg;          /* column of saved message
extern   int               w_no;            /* whereami stack pointer
extern   int               zero;            /* address is passed
extern   struct   where    w_stk[];         /* whereami stack /* These are the termcap variables used by ksh.
 * See tables.c for explanations.
 */ extern   char    *k0, *k1, *k2, *k3, *k4, *k5, *k6, *k7, *k8, *k9,
                 *KA, *KB, *KC, *KD, *KE, *KF, *cd, *ce, *cm, *cs,
                 *dc, *ic, *nd, *se, *so, *te, *ti, *us, *ue, *kee,
                 *ks, *vb, *FC, *BC, *WC;

extern   int     sg, ug;
```

Jun  2 09:26 1983  history.c Page 1

```
/****************************************************************
 *                                                              *
 * Module:          history                                     *
 * Main program:    ksh                                         *
 * Version:         1.0                                         *
 * Date:            June 2, 1983                                *
 * Author:          Jonathan E. Steinhart                       *
 *                                                              *
 ****************************************************************/

/****************************************************************
 *                                                              *
 *          Copyright (C) 1983 Tektronix, Inc.                  *
 *               All Rights Reserved                            *
 *                                                              *
 ****************************************************************
 *                                                              *
 *   ######  #    #                                             *
 *   #    #  #    #                                             *
 *   ####  ####   #### #### ####  # #                           *
 *   #    ###     #    #    #  #  # #                           *
 *   #    ####    #    #    #  #  ##                            *
 *   #    #  #    #    #    #  #  # #        . R .              *
 *   #    #  #    #    #    #  #  # #                           *
 *   ###### # ###  ####  #  ####  # #                           *
 *                                                              *
 *                COMMITTED TO EXCELLENCE                       *
 *                                                              *
 ****************************************************************/
```

```
/* Purpose:       Install argument on history key.
 *
 * Description:   A picture of what an action string with the argument is
 *                assembled. The age parameter of the hist action is left off.
 *                The keys are scanned from right to left. If the action string
 *                matches an existing one that fact is noted. Keys with no
 *                action string except hist are also noted. The oldest hist
 *                action string is also remembered. The age is incremented on
 *                existing history action strings. A key is selected for history
 *                as follows: Duplicate keys are used first. If there are none,
 *                vacancies are filled. If there are no vacancies, the oldest
 *                string is discarded and the new one is installed.
 *
 * Invocation:    Called from a message routine with user arguments supplied so that the
 *                arguments can be recorded.
 * Parameters:    A pointer to the current tree node, and the argument to be
 *                recorded are expected.
 *
 * Return:        Nothing special.
 *
 * Errors:        Lack of buffer space is announced, no recording is done.
 */ include <ctype.h>                           /* brings us isspace
include "ksh.h"                             /* all kinds of good stuff char    *index (), *malloc (), *realloc (), *strcpy (), *trim ();

history (tree, arg)                          /* arg. becomes node history

TREE_PTR        tree;                        /* data assigned in this node
register char   *arg;                        /* something to remember
{
        char         *buf = arg + strlen (arg) + 1;  /* grab some buffer space
        register char   *p = buf;            /* one of several buffer ptrs
        register char   *q = arg;            /* pointer to artifact
        register int    i;                   /* number of available key
        int     j = 0;                       /* used for carbon-dating
        int     clone = -1;                  /* duplicate artifacts
        int     vacant = -1;                 /* empty slot in archives
        int     granny = -1;                 /* oldest living artifact if (!In_cb (buf + strlen (arg) + 4)) {  /* make sure there's room
                /* VARARGS */
                error (NON_FATAL, BUFFOON);
                return;
        }

*p++ = PAR;                          /* set up comparison string
        while (*p++ = *q++)
                ;
        *p-- = '\0';
        *p = HIST;

for (i = NKEYS - 1; i >= 0; i--)     /* look for avaialble key if (Tstptr (i, KAP)) {       /* must be a key action ptr.

/* check for duplicates
                        if (!strncmp (tree->ptr[i].kap, buf, strlen (buf)))
                                clone = i;

/* check for unused hist keys
                        if (Bmask (*tree->ptr[i].kap) == HIST)
                                vacant = i;
```

```
                                    /* find out who is the oldest
        if (p = index (tree->ptr[i].kap, HIST)) {
                if (*++p > j) {
                        j = *p;
                        granny = i;
                }

/* make them a little older
                if (Adata (*p))
                        (*p)++;
        }
}

/* use duplicate key if there
                                       are any, then try vacancies,
                                       use oldest if we have to     *
if ((i = (clone < 0) ? ((vacant < 0) ? granny : vacant) : clone) >= 0)

strcpy (buf, trim (arg));   /* make the key label
        for (q = index (buf, '\0') - 1; isspace (*q); q--)
                *q = '\0';

if (Memleft) {              /* don't make if no room
                Makstr (tree->lp[i], buf);
        }
        else {
                /* VARARGS */
                error (NON_FATAL, MEMORY);
                return;
        }

*buf = PAR;                 /* make the action strin
        strcpy (buf + 1, arg);
        p = buf + strlen (buf);
        *p++ = HIST;
        *p++ = '0';                 /* youngsters are age 0
        *p = '\0';

if (Memleft) {              /* don't make if no room
                Makstr (tree->ptr[i].kap, buf);
        }
        else
                /* VARARGS */
                error (NON_FATAL, MEMORY);

}                                   /* ingrained in our memory
        return;
}
```

I claim:

1. A method of automatically assigning a user entered string to unassigned softkeys in a node on a computer terminal by automatically storing said string into a memory location corresponding to an unassigned softkey, the method comprising, in the order recited, the steps of:

a. automatically comparing the user entered string in response to entry of said string, against the data stored in the corresponding memory location for each unassigned softkey, and returning control to the user if a match is found;

b. automatically, in response to entry of said string, searching for a blank memory location that corresponds to a blank unassigned softkey, storing the user entered string in the corresponding memory location of that unassigned softkey, generating and storing a label to be displayed for that unassigned softkey, and returning control to the user if a match is found;

c. if a match is not found in either of steps a and b, automatically FIFO storing the user entered string into the corresponding memory locations of the unassigned softkeys having the earliest entered user entered string, generating and storing a label to be displayed for the newly stored string, and then returning control to the user;

d. generating an age character with each stored user entered string to identify its age since entry with respect to each of the other stored user entered strings, the string having the age character corresponding to the oldest entered string being considered the first entered string in step c;

step a. further includes the step of:

e. resetting the age character for the stored data where the match was found to be the youngest age and advancing the age character of each of the other stored user entered strings; and steps b. and c. each further includes the step of:

f. assigning the youngest age character to the user entered string being stored and advancing the age character of each of the other stored user strings.

2. A system for automatically assigning a user entered string to an unassigned softkey in a node on a computer terminal by automatically storing said string into a memory location corresponding to an unassigned softkey, the system comprising:

means for automatically comparing the user entered string, in response to entry of the string, against the data stored in the corresponding memory location for each unassigned softkey, and returning control to the user if a match is found;

means coupled to said comparing means for automatically searching, if a match is not found by the comparing means, for a blank memory location that corresponds to a blank unassigned softkey, storing the user entered string in the corresponding memory location of that unassigned softkey, generating and storing a label to be displayed for that unassigned softkey, and returning control to the user if a match is found;

means coupled to the searching means for automatically FIFO storing, if a match is not found by the searching means, the user entered string into the corresponding memory locations of the unassigned softkeys having the earliest entered user entered string, generating and storing a label to be displayed for the newly stored string, and then returning control to the user;

means coupled to the FIFO storing means for generating an age character with each stored user entered string to identify its age since entry with respect to each of the other stored user entered strings, the string having the age character corresponding to the oldest entered string being considered the first entered string in the FIFO storing means;

the means for comparing further includes means for resetting the age character for the stored data where the match was found to be the youngest age and advancing the age character of each of the other stored user entered strings; and the means for searching and the means for FIFO storing each further includes means for assigning the youngest age character to the user entered string being stored and advancing the age character of each of the other stored user strings.

* * * * *